(12) United States Patent
Goto

(10) Patent No.: US 7,140,545 B2
(45) Date of Patent: Nov. 28, 2006

(54) OPTICAL READING DEVICE AND PORTABLE COMMUNICATION EQUIPMENT HAVING THE OPTICAL READING DEVICE

(75) Inventor: Hiroshige Goto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/133,399

(22) Filed: Apr. 29, 2002

(65) Prior Publication Data

US 2002/0158134 A1   Oct. 31, 2002

(30) Foreign Application Priority Data

Apr. 27, 2001 (JP) .......................... P2001-133297

(51) Int. Cl.
*G06K 7/10* (2006.01)
(52) U.S. Cl. .................... 235/462.43; 235/462.41; 235/462.45; 235/462.01; 235/462.09
(58) Field of Classification Search ..............................
235/462.01–462.25, 462.35–462.45, 472.01–472.03, 235/494
See application file for complete search history.

(56) References Cited

U.S. PATENT DOCUMENTS

| | | | | | |
|---|---|---|---|---|---|
| 4,418,277 | A | * | 11/1983 | Tremmel et al. ............. | 235/472 |
| 4,656,345 | A | * | 4/1987 | Kurimoto ............... | 235/462.25 |
| 5,029,183 | A | * | 7/1991 | Tymes ........................ | 235/472 |
| 5,095,197 | A | * | 3/1992 | Chadima .................... | 235/472 |
| 5,349,678 | A | * | 9/1994 | Morris et al. ................ | 235/472 |
| 5,569,902 | A | * | 10/1996 | Wood et al. ........... | 235/462.48 |
| 5,589,678 | A | * | 12/1996 | Atsumi et al. ......... | 235/462.42 |
| 5,945,656 | A | * | 8/1999 | Liemelson et al. .... | 235/462.01 |
| 5,949,052 | A | * | 9/1999 | Longacre et al. ...... | 235/462.08 |
| 5,962,836 | A | * | 10/1999 | Tani et al. ................... | 235/454 |
| 5,974,204 | A | * | 10/1999 | Lin et al. .................... | 382/314 |
| 5,999,666 | A | * | 12/1999 | Gobeli et al. ............... | 382/313 |
| 6,003,774 | A | * | 12/1999 | Bard et al. ................... | 235/472 |
| 6,102,293 | A | * | 8/2000 | Barkan et al. ............... | 235/472 |
| 6,104,845 | A | * | 8/2000 | Lipman et al. ............. | 382/313 |
| 6,270,013 | B1 | * | 8/2001 | Lipman et al. ............. | 235/454 |
| 6,446,871 | B1 | * | 9/2002 | Buckley et al. ........ | 235/472.03 |
| 6,491,225 | B1 | * | 12/2002 | Dvorkis et al. ........ | 235/472.01 |
| 6,497,367 | B1 | * | 12/2002 | Conzola et al. ............. | 235/472 |
| 6,557,765 | B1 | * | 5/2003 | Kito ........................ | 235/462.3 |
| 6,607,131 | B1 | * | 8/2003 | Maurizzi et al. ....... | 235/462.26 |
| 6,607,134 | B1 | * | 8/2003 | Bard et al. ............. | 235/472.01 |

FOREIGN PATENT DOCUMENTS

| JP | 06-177948 | 6/1994 |
|---|---|---|
| JP | 11-239097 | 8/1999 |
| JP | 2000-209146 | 7/2000 |

\* cited by examiner

*Primary Examiner*—Ahshik Kim
(74) *Attorney, Agent, or Firm*—Finnegan, Henderson, Farabow, Garrett & Dunner, L.L.P.

(57) ABSTRACT

An optical reading device optically reads information on a surface. The optical reading device includes a contact detection unit, a reading unit, and a signal processing unit. The contact detection unit provides a signal when the optical reading device is within a threshold distance of a surface having information. The reading unit includes a light source unit and a light detection unit, wherein the light source unit irradiates light on the surface and the light detection unit detects light reflected from the surface, based on the signal from the contact detection unit. The signal processing unit identifies the information based on analyzing the light reflected from the surface. In addition, the optical reading device may be implemented in a mobile communications device, which also includes a transmitting unit that transmits the information identified by the signal processing unit.

25 Claims, 9 Drawing Sheets

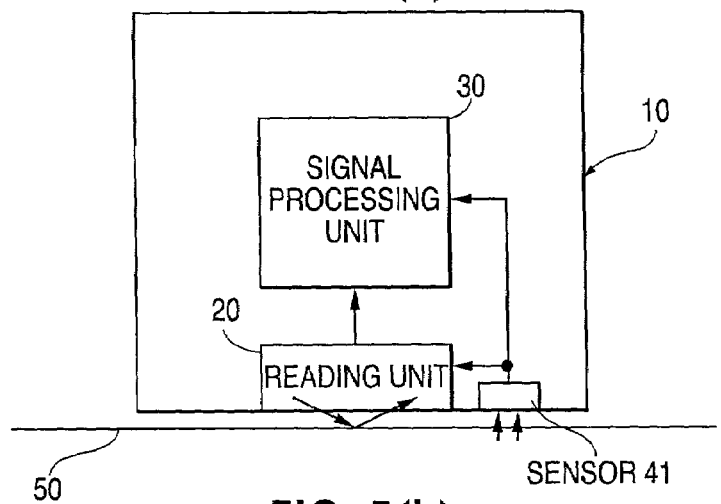
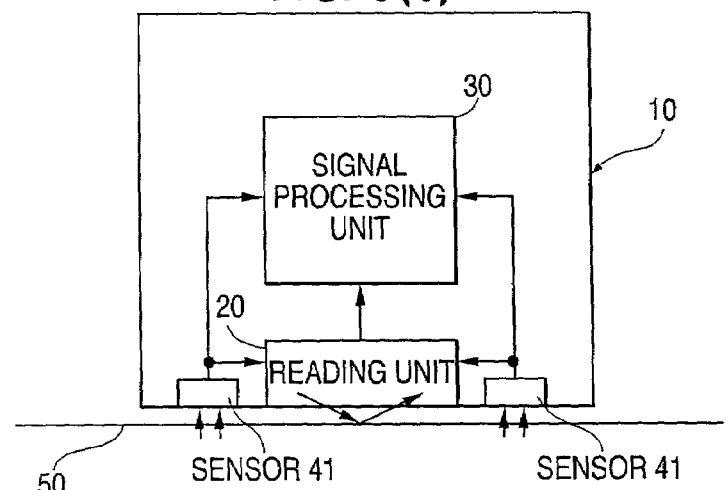
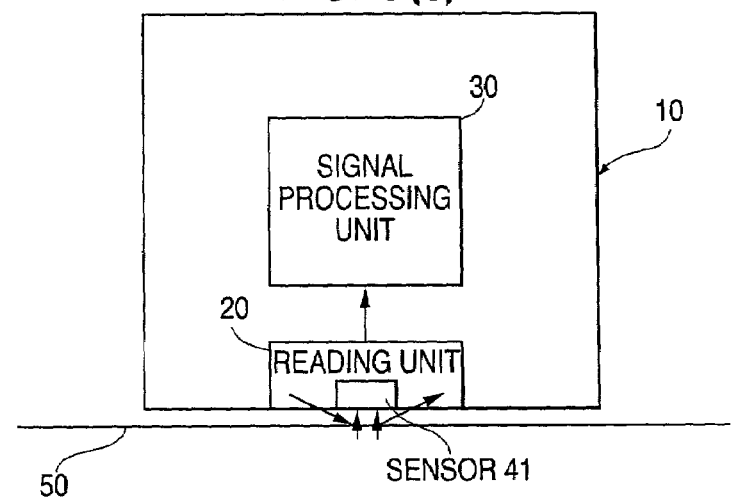

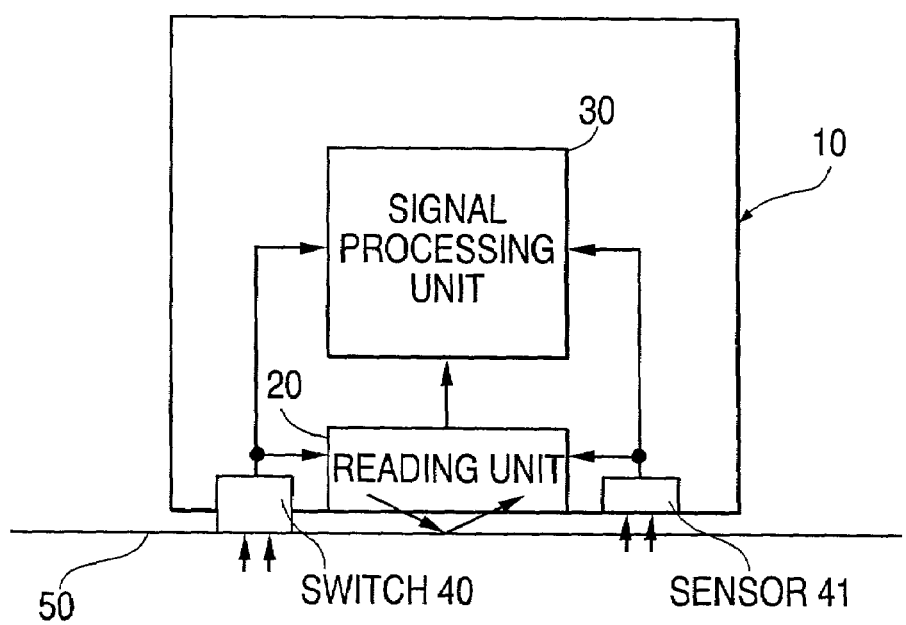

OPTICAL READING DEVICE AND PORTABLE COMMUNICATION EQUIPMENT HAVING THE OPTICAL READING DEVICE

CROSS REFERENCE RELATED APPLICATIONS

This application claims the benefit of priority from prior Japanese Patent Application P2001-133297 filed on Apr. 27, 2001, the contents of which are incorporated by reference herein in its entirety.

FIELD OF THE INVENTION

The present invention relates to an optical reading device, portable communications equipment, and a method of optically reading information.

BACKGROUND OF THE INVENTION

Recently, automatic recognition systems, such as bar code systems, have become widespread. FIGS. 1A and 1B show cross sectional views of the structure of a conventional bar code reading device. FIG. 1A shows the device in an idle state. FIG. 1B shows the device reading a bar code.

As shown in FIGS. 1A and 1B, a contact-type bar code reading device 100 includes an optical reading unit 200 for reading a bar code, a signal processing unit 300 for processing information in the bar code read by the optical reading unit 200, and an activation switch 400 for controlling when the bar code reading device 100 is on/off.

The optical reading unit 200 has a light source (not shown) for providing irradiating light to the bar code, an optical system (not shown) for collecting light reflected from the bar code, and a solid-state imaging device (not shown) for detecting the light collected by the optical system.

The operation of the contact-type bar code reading device 100 will now be described. As shown in FIG. 1A, the bar code reading device 100 and the optical reading unit 200 may be idle or turned off when the activation switch 400 is not pushed.

As shown in FIG. 1B, a user pushes the activation switch 400 to read the bar code. When the activation switch 400 is pushed, the bar code reading device 100 becomes operational, and the optical reading unit 200 irradiates light from the light source. For example, the bar code reading device 100 may be activated to read a bar code 510 printed on sheet surface 500. Light reflected from the bar code 510 is detected by the solid-state imaging device of the optical reading unit 200. The detected light is then subjected to analysis by the signal processing unit 300.

In conventional devices, the activation switch 400 is provided on a surface different from a surface of the bar code. Therefore, in order to read the bar code, the user must push the activation switch 400 prior to reading the bar code, or alternatively, after the bar code reading device is brought into contact with the surface 500.

Unfortunately, requiring the user to separately push an activation switch has several disadvantages. The operation time of the bar code reading device is prolonged. Since the solid-state imaging device is activated by the user, peripheral light may enter the bar code reading device and onto the solid-state imaging device, and thus, cause an erroneous determination. In addition, excessive light may cause the solid-state imaging device to become saturated. As a result, the solid-state imaging device may require time to recover and consume more power. Furthermore, the user must coordinate pushing the activation switch with reading the bar code, and thus, the reading the bar code may become difficult to easily coordinate.

Accordingly, it would be desirable to provide methods, apparatus, and systems that overcome these and other shortcomings of conventional bar code devices.

SUMMARY OF THE INVENTION

According to an aspect of the present invention, an optical reading device comprises: a contact detection unit for providing a signal when the optical reading device is within a threshold distance of a surface; a reading unit having a light source unit and a light detection unit, wherein the light source unit irradiates light on the surface and the light detection unit detects light reflected from the surface, based on the signal from the contact detection unit; and a signal processing unit for identifying the information based on analyzing the light reflected from the surface.

In accordance with another aspect of the present invention, a portable communication device comprises: a contact detection unit for providing a signal when the optical reading device is within a threshold distance of a surface; a reading unit having a light source unit and a light detection unit, wherein the light source unit irradiates light on the surface and the light detection unit detects light reflected from the surface, based on the signal from the contact detection unit; a signal processing unit for identifying the information based on analyzing the light reflected from the surface; and a transmitting unit for transmitting the information identified by the signal processing unit.

In accordance with another aspect of the present invention, a method of activating a device to read information on a surface comprises: irradiating light on the surface based on when the device is within a threshold distance to the surface; detecting light reflected from the surface; and identifying the information on the surface based on the reflected light.

Other features and advantages of the present invention will become apparent from the following detailed description. It should be understood, however, that the detailed description and specific examples, while indicating embodiments of the invention, are given by way of illustration only. Various changes and modifications within the spirit and scope of the invention will become apparent to those skilled in the art from this detailed description.

BRIEF DESCRIPTION OF THE DRAWINGS

The accompanying drawings, which are incorporated in and constitute a part of this specification, illustrate several embodiments and together with the description, serve to explain the principles of the invention. A more complete appreciation of the present invention and many of its attendant advantages will be readily obtained by reference to the following detailed description considered in connection with the accompanying drawings, in which:

FIGS. 5A–C show cross-sectional views of bar code reading devices during operation, in accordance with embodiments consistent with the principles of the present invention.

FIG. 6 shows a cross-sectional view of a optical reading device during operation, in accordance with an embodiment consistent with the principles of the present invention;

DETAILED DESCRIPTION OF THE PREFERRED EMBODIMENTS

Figure 1A:
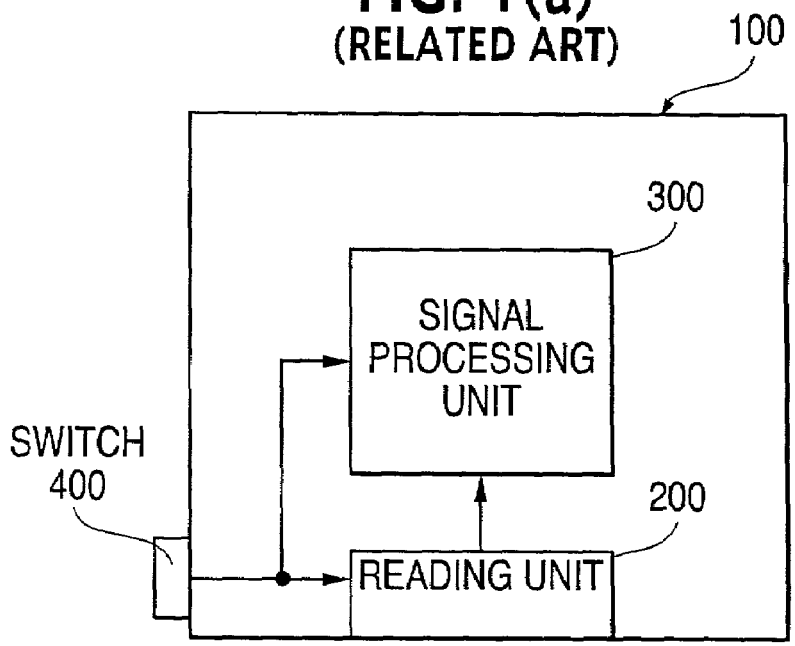
FIG. 1A shows a cross-sectional view of a conventional bar code reading device in an idle state.
Figure 1B:
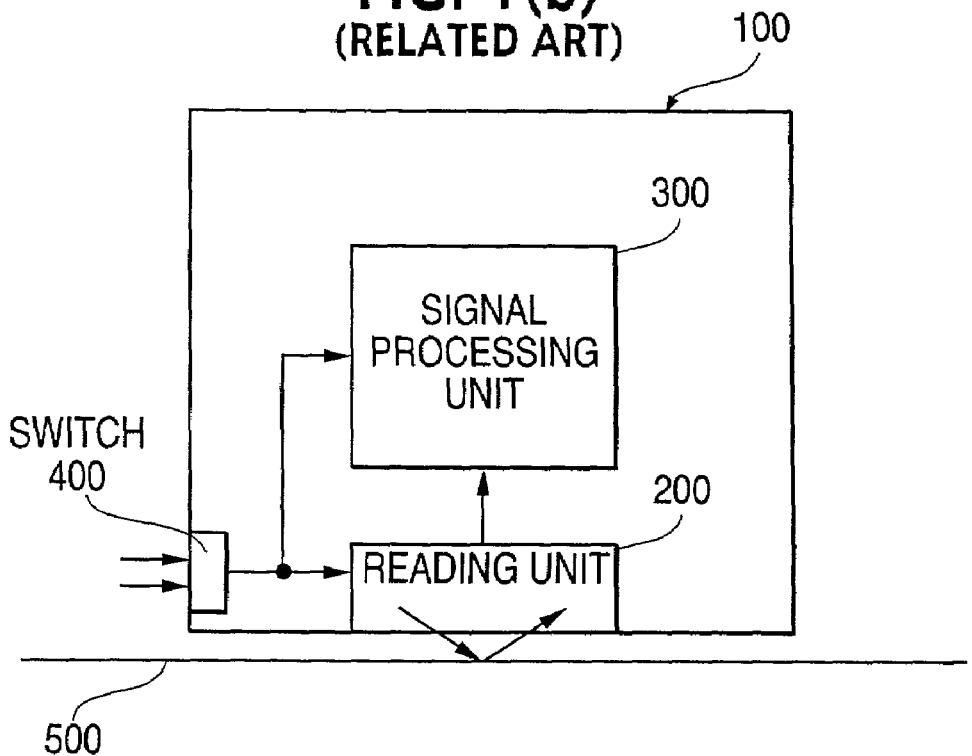
FIG. 1B shows a cross-sectional view of a conventional bar code reading device during operation.

The present invention will be described by embodiments with reference to the drawings. In this description, like portions are denoted by the same reference numerals throughout the drawings.

Figure 2A:
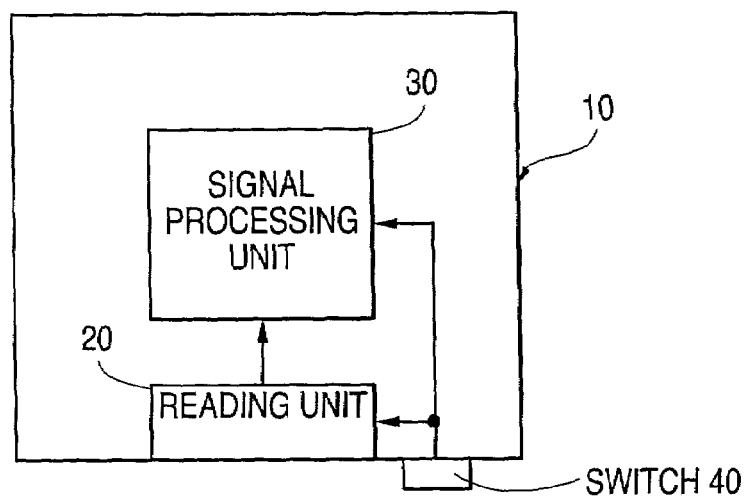
FIG. 2A shows a cross-sectional view of an information reading device in an idle state, in accordance with an embodiment consistent the principles of the present invention.
Figure 2B:
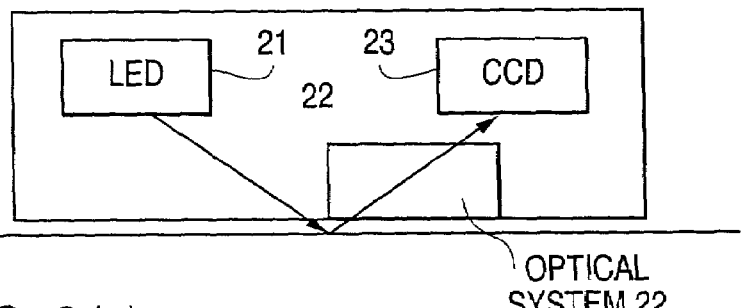
FIG. 2B shows a block diagram of an optical reading unit, in accordance with an embodiment consistent with the principles of the present invention.
Figure 2C:
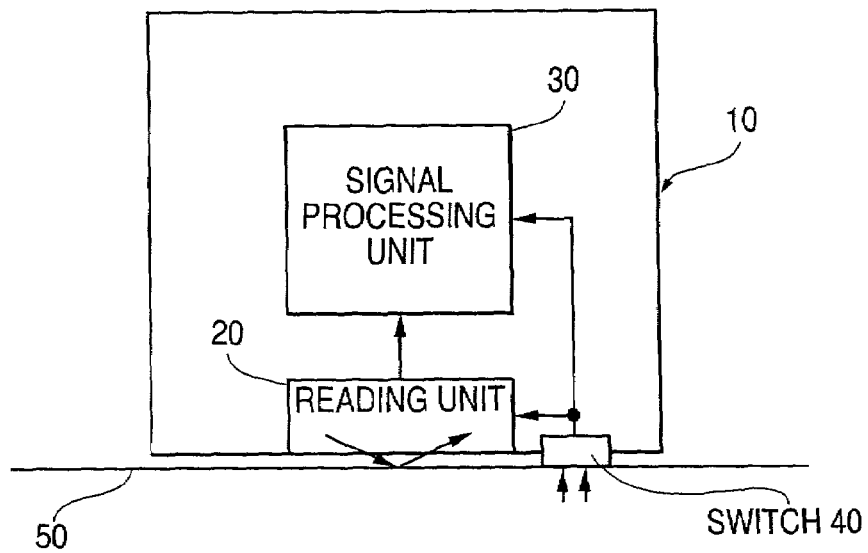
FIG. 2C shows a cross-sectional view of an information reading device during operation, in accordance with an embodiment consistent with the principles of the present invention.

An optical reading device according to a first embodiment of the present invention is described with reference to FIGS. 2A to 2C. FIG. 2A shows a cross-sectional view of an information reading device in an idle state, in accordance with an embodiment consistent the principles of the present invention. FIG. 2B shows a block diagram of an optical reading unit, in accordance with an embodiment consistent with the principles of the present invention. FIG. 2C shows a cross-sectional view of an information reading device during operation, in accordance with an embodiment consistent with the principles of the present invention. The optical reading device reads information, such as, a bar code, figures, images, characters, and text.

As shown in FIG. 2A, a contact-type information reading device 10 includes an optical reading unit (reading unit) 20 for reading information, a signal processing unit 30 for processing information read by the optical reading unit 20, and an activation switch (contact detection unit) 40 for controlling when the optical reading device is idle or on/off. As shown in FIG. 2B, the optical reading unit 20 has a light source 21, and an optical system 22. The light source 21 may be, for example, a light emitting diode (LED). The optical system 22 may comprise, for example, a magnifying optical lens system (not shown), a reducing optical lens system (not shown), and a solid-state imaging device (light detection unit) 23, such as a charge coupled device (CCD), and CMOS type imaging sensor (CMOS sensor).

In the optical reading unit 20, the activation switch 40 is placed on, in contact, or near the surface on which the information appears. For example, the activation switch 40 may be a mechanical switch, which is turned on when pushed against a surface, such as a sheet surface 50.

The operation of the contact-type optical reading device will now be described. The optical reading device 10 is activated by pushing the activation switch 40. As shown in FIG. 2A, when the optical reading device 10 is apart from the sheet surface 50 on which the information is printed, the activation switch 40 is not pushed. Therefore, when the activation switch 40 is not pushed, the optical reading unit 20 and the signal processing unit 30 are idle or off.

To read the information, the optical reading device 10 is brought into close proximity or contact with the sheet surface 50 on which the information is printed. The optical reading unit 20 and the bar code may coincide with each other since the activation switch 40 is provided on the same surface on which the information appears. When the activation switch 40 is pushed, the optical reading device 10 becomes operational. Specifically, the optical reading unit 20 and the signal processing unit 30 become operational. As shown in FIGS. 2B and 2C, when the optical reading unit 20 becomes operational, the light source 21 starts to irradiate light. This irradiated light is reflected based on the reflectivity of the information appearing on the surface 50. This reflected light is collected by the optical system 22, and the collected light is detected by the solid-state imaging device 23. The solid-state imaging device 23 converts the detected light into an electronic signal, which is analyzed and processed by the signal processing unit 30, for example, to read or identify the information appearing on the sheet surface 50.

The reading of the information may end when the signal processing unit 30 is finished with analyzing and processing the signal from the optical reading device 10. For example, when the signal processing unit 30 is finished, the optical reading device 10 may then be idled or turned off. Alternatively, when the activation switch 40 is separated from the sheet surface 50, the optical reading device 10 may be idled or turned off. Accordingly, the optical reading device 10 may become operational simultaneously when it is brought into contact with the sheet surface 50, and idled or turned off after acquiring a specified signal, such as when a bar code is read. Hence, the optical reading device may be operated more efficiently when reading the information. For example, the operation time of the optical reading device may be minimized, for example, to conserve power consumption.

Excessive light may also be prevented from being exposed onto the solid-state imaging device 23, and thus, making it possible to improve the detection accuracy of the solid-state imaging device 23. Saturation of the solid-state imaging device may also be prevented. Thus, recovery time of the solid state imaging device 20 may also be improved and power consumption may be minimized.

Furthermore, since the activation switch is pushed simultaneously when the optical reading device contacts the surface 50, the user does not have to push and the activation switch 40. Therefore, the operation of the reading device 10 is simplified.

Figure 3:
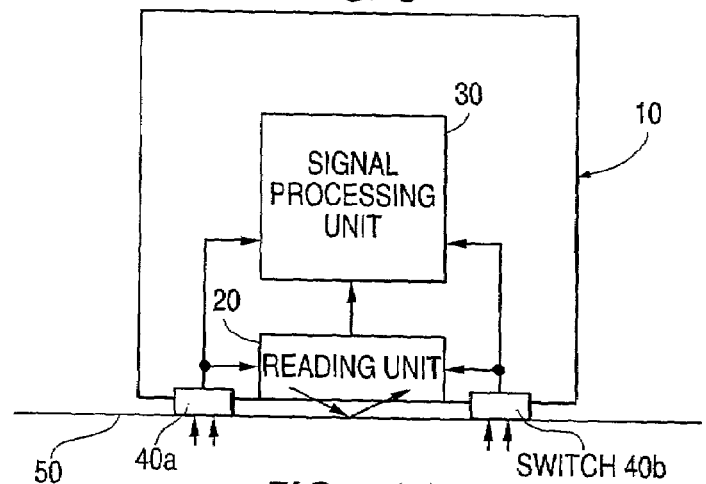
FIG. 3 shows a cross-sectional view of an optical reading device during operation, in accordance with an embodiment consistent with the principles of the present invention.

The position of the activation switch is not limited to the position as shown FIGS. 2A and 2C. For example, the activation switch may be positioned as shown in FIG. 3. FIG. 3 shows a cross-sectional view of an optical reading device during operation, in accordance with an embodiment consistent with the principles of the present invention.

As shown in FIG. 3, two activation switches 40a and 40b may be provided in two locations sandwiching the optical reading unit 20. The optical reading device 10 may become active when any one of the activations switches 40a and 40b is turned on or when both are turned on. For example, in order to improve reading accuracy, the optical reading device 10 may be activated or operational when both of the activation switches 40a and 40b are turned on. For example, if the two activation switches 40a and 40b sandwich the optical reading unit 20 and are turned on, this may indicate that the optical reading unit 10 is parallel to the surface 50.

Alternatively, any number of activation switches, such as more than two activation switches, may be provided.

The optical reading unit 20 may comprise a light source (not shown), such as a light emitting diode (LED). In addition, the optical reading unit 20 may include an optical system (not shown) that may comprise, for example, a magnifying optical lens system (not shown), a reducing optical lens system (not shown), and a solid-state imaging device (light detection unit), such as a charge coupled device (CCD), and CMOS type imaging sensor (CMOS sensor). The signal processing unit 30 analyzes and processes the information provided from the optical reading unit 20, for example, to read or identify the information appearing on the surface 50.

Figure 4A:
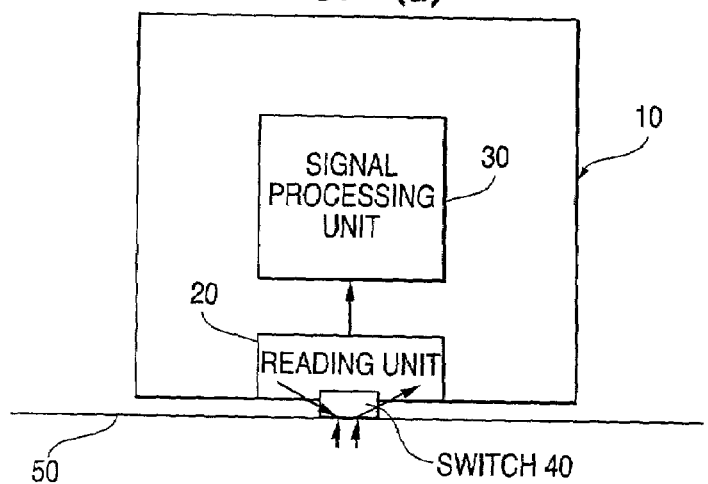
FIG. 4A shows a cross-sectional view of an optical reading device during operation, in accordance with an embodiment consistent with the principles of the present invention.
Figure 4B:
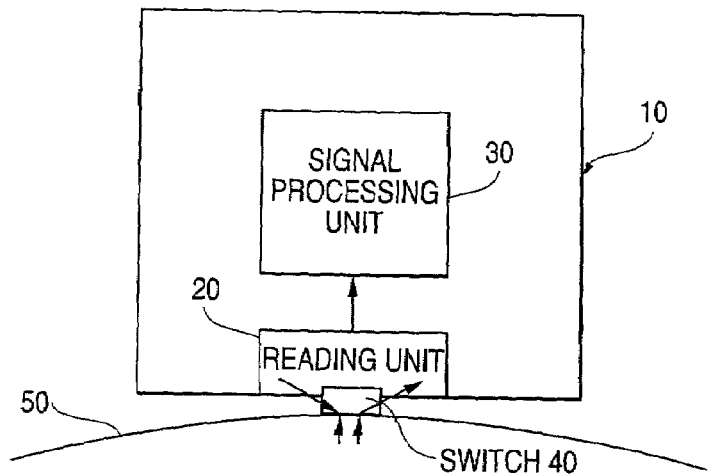
FIG. 4B shows a cross-sectional view of an optical reading device reading a bar code on curved surface, in accordance with an embodiment consistent with the principles of the present invention.

FIG. 4A shows a cross-sectional view of an optical reading device during operation, in accordance with an embodiment consistent with the principles of the present invention. FIG. 4B shows a cross-sectional view of an optical reading device reading a bar code on curved surface, in accordance with an embodiment consistent with the principles of the present invention.

As shown in FIG. 4A, the activation switch 40 is provided on the center of the contact surface of the optical reading unit 20, for example, to accommodate information printed on a curved sheet surface 50. In addition, the optical reading unit 20 may read information on any surface shape consistent with the principles of the present invention.

The distance between the optical reading unit 20 and the information may be set, for example, to minimize outside light and increase detection accuracy. The activation switch 40 may also activate or turn on the optical reading device 10 based on a variety of conditions. For example, the activation switch 40 may use push-type mechanical switch, a contact conductance or a contact resistor.

The optical reading unit 20 may comprise a light source (not shown), such as a light emitting diode (LED). In addition, the optical reading unit 20 may include an optical system (not shown) that may comprise, for example, a magnifying optical lens system (not shown), a reducing optical lens system (not shown), and a solid-state imaging device (light detection unit), such as a charge coupled device (CCD), and CMOS type imaging sensor (CMOS sensor). The signal processing unit 30 analyzes and processes the information provided from the optical reading unit 20, for example, to read or identify the information appearing on the surface 50.

FIGS. 5A–C show cross-sectional views of bar code reading devices during operation, in accordance with embodiments consistent with the principles of the present invention. For example, a sensor (contact sensor unit) 41 for sensing the contact of the optical reading device to the sheet surface may be used as alternative to the activation switch 40.

As shown in FIG. 5A, the sensor 41 is located adjacent to the optical reading unit 20. As shown in FIG. 5B, sensors 41 are located in two locations sandwiching the optical reading unit 20 similarly to the structure shown in FIG. 3. As shown in FIG. 5C, the sensor 41 is located on the center of the optical reading unit 20 similarly to the structure shown in FIGS. 4A and 4B. Sensor 41 may be a sensor which operates based on, for example, mechanical strength exerted by a user.

The optical reading unit 20 may comprise a light source (not shown), such as a light emitting diode (LED). In addition, the optical reading unit 20 may include an optical system (not shown) that may comprise, for example, a magnifying optical lens system (not shown), a reducing optical lens system (not shown), and a solid-state imaging device (light detection unit), such as a charge coupled device (CCD), and CMOS type imaging sensor (CMOS sensor). The signal processing unit 30 analyzes and processes the information provided from the optical reading unit 20, for example, to read or identify the information appearing on the surface 50.

FIG. 6 shows a cross-sectional view of an optical reading device during operation, in accordance with an embodiment consistent with the principles of the present invention. As shown in FIG. 6, the activation switch 40 and the sensor 41 may used together. For example, activation switch 40 may be a mechanical push-type switch. In addition, sensor 41 may be an electronic capacitance pressure sensor, an electronic resistance strain pressure sensor, a touch sensor using pressure-sensing conductive rubber, or a touch sensor using pressure-sensing conductive plastics.

The optical reading unit 20 may comprise a light source (not shown), such as a light emitting diode (LED). In addition, the optical reading unit 20 may include an optical system (not shown) that may comprise, for example, a magnifying optical lens system (not shown), a reducing optical lens system (not shown), and a solid-state imaging device (light detection unit), such as a charge coupled device (CCD), and CMOS type imaging sensor (CMOS sensor). The signal processing unit 30 analyzes and processes the information provided from the optical reading unit 20, for example, to read or identify the information appearing on the surface 50.

Figure 7:
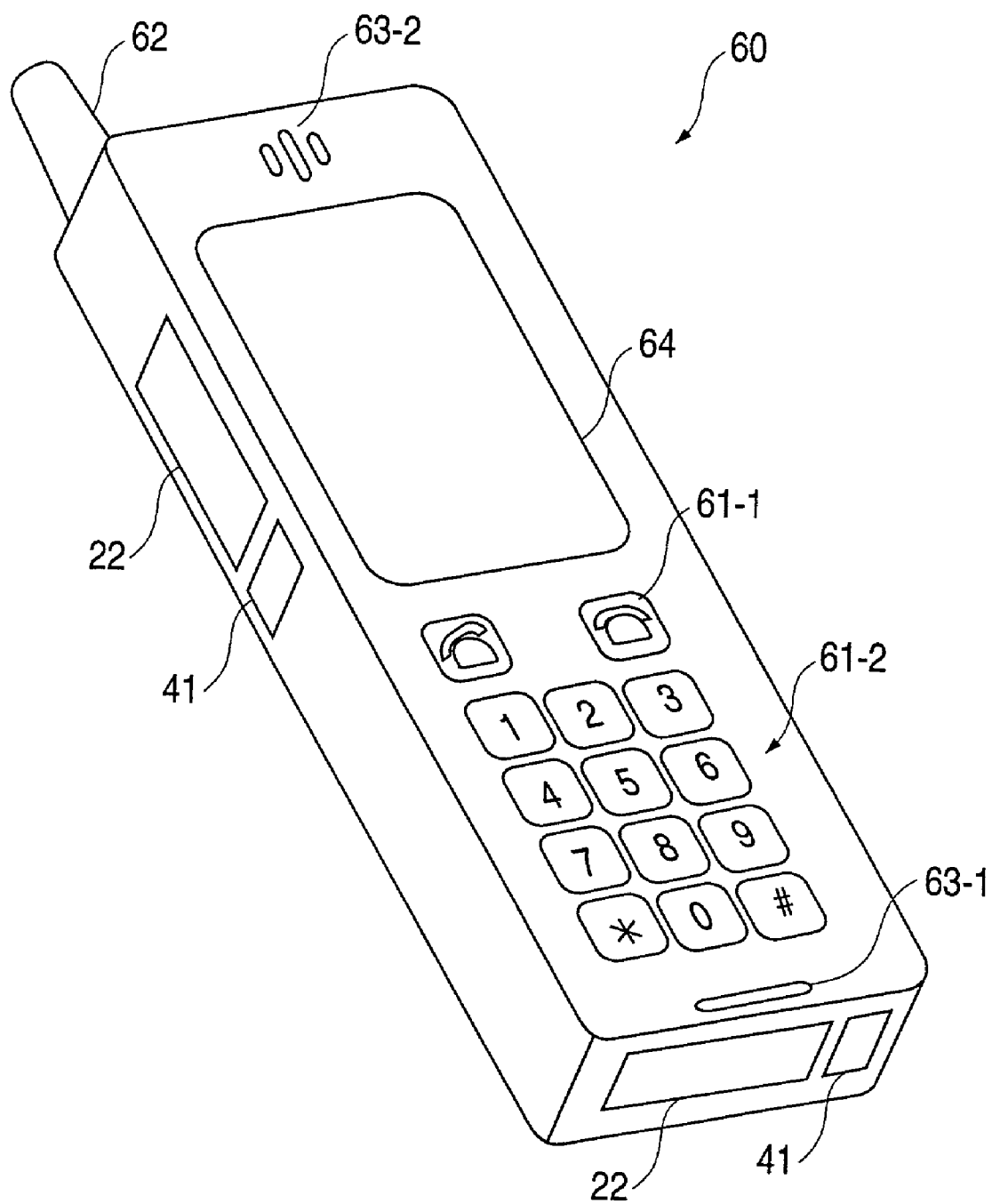
FIG. 7 shows a mobile telephone having an optical reading device, in accordance with an embodiment consistent with the principles of the present invention.
Figure 8:
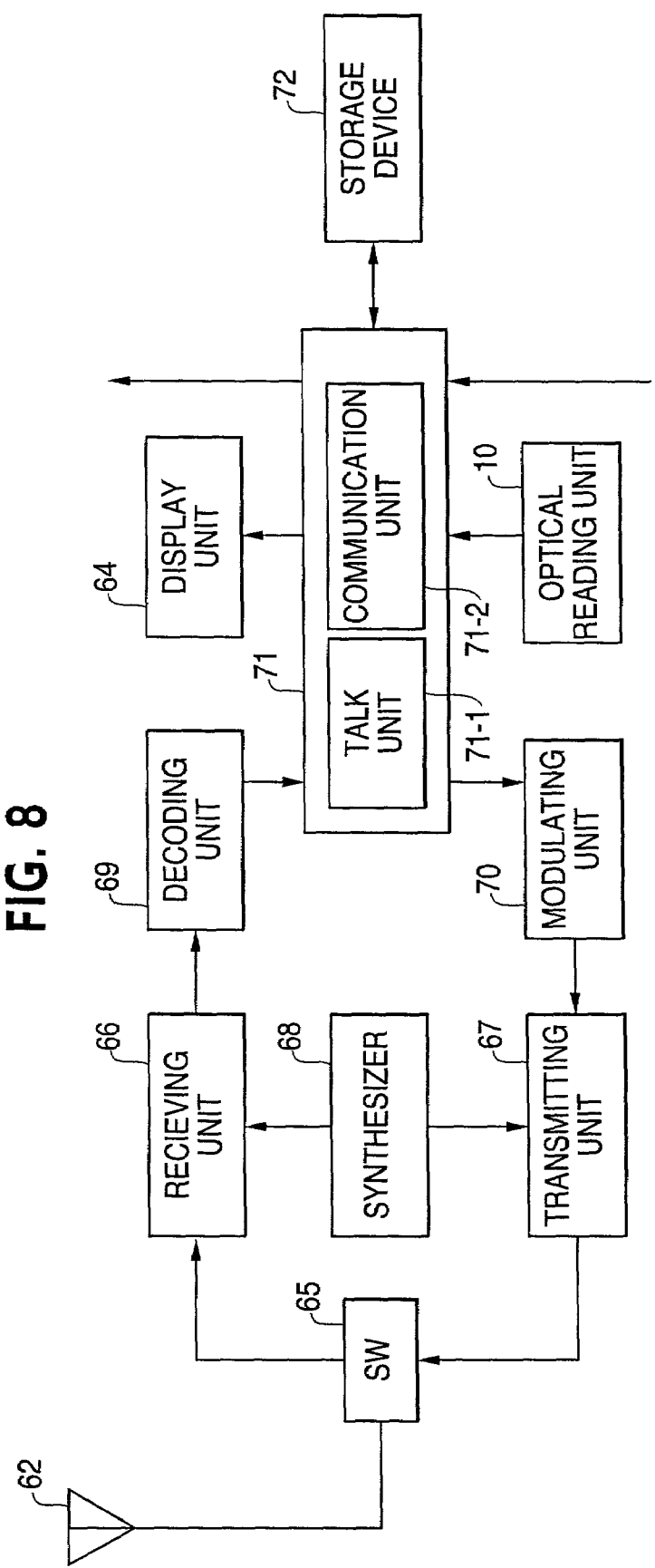
FIG. 8 shows block diagram partially showing an internal configuration of the mobile telephone shown in FIG. 7, in accordance with an embodiment consistent with the principles of the present invention.

FIG. 7 shows a mobile telephone having an optical reading device, in accordance with an embodiment consistent with the principles of the present invention. FIG. 8 shows block diagram partially showing an internal configuration of the mobile telephone shown in FIG. 7, in accordance with an embodiment consistent with the principles of the present invention.

As shown in FIG. 7, a mobile telephone 60 has a power button 61-1, dial buttons 61-2, a talk button 61-3, an antenna 62 transmitting and receiving an electronic wave, a mouthpiece 63-1, an earpiece 63-2, a display unit 64 for displaying transmitted/received data and information concerning the data, and an optical reading device (not shown). The optical reading device may be implemented such that the optical system 22 and the sensor 41 are exposed. In addition, the optical reading device may have any of the configurations described above.

As shown in FIG. 8, the mobile telephone 60 has the antenna 62, a high-frequency switch 65, a receiving unit 66, a transmitting unit 67, a synthesizer 68, a decoding unit 69, a modulating unit 70, a signal processing unit 71, the display unit 64, a supplemental storage device 72, and an optical reading unit 10. A radio carrier wave signal, such from a base station (not shown) is received by the antenna 62, and then inputted to the receiving unit 66 via the high-frequency switch 65. In the receiving unit 66, the received radio carrier wave signal is mixed with a reference oscillation signal generated by the synthesizer 68 to be downconverted into a received intermediate frequency signal.

The received intermediate frequency signal outputted from the receiving unit 66 is inputted to the decoding unit 69. In the decoding unit 69, the received intermediate frequency signal is subjected to digital decoding to produce a digital decoded signal.

The signal processing unit 71 decollates the digital decoded signal, for example, for a time slot. If the data decollated in the slot is audio data, then the audio data is decoded by a talk unit 71-1. The decoded data is subjected to D/A conversion to generate an analog audio signal, which is then amplified and outputted to the earpiece 63-2. Moreover, if the data decollated in a time slot is packet data or control data, then the data is analyzed by a data communication unit 71-2, and displayed on the display unit 64. Furthermore, audio data, packet data and control data may be stored in the supplemental storage device 72 in accordance with a selection of the user.

The user may provide input, such as an audio input, to the mouthpiece 63-1. The audio input is compressed and encoded by the signal processing unit 71. Furthermore, this encoded audio data, the control data, and the packet data may be multiplexed by the signal processing unit 71. As described above, the optical reading unit 10 can read the information by bringing the mobile telephone into close proximity or contact with the surface on which the information appears. Data read from the information may also be multiplexed by the signal processing unit 71 similarly to the control data and the packet data. The modulating unit 70 subjects the transmitted intermediate frequency signal to digital modulation by the multiplexed digital communication signal, and the transmitted intermediate frequency signal is then inputted to the transmitting unit 67.

The transmitting unit 67 mixes the transmitted intermediate frequency signal with the reference oscillation signal generated by the synthesizer 68, and upconverts the signal to a radio carrier wave frequency. The transmitting unit 67 amplifies the upconverted signal to a specified transmission power level. The radio carrier wave signal outputted from the transmitting unit 67 is transmitted from the antenna 62 via the high-frequency switch 65 to a base station (not shown).

The mobile telephone 60 may be provided with an optical reading device 10 as described above. The information read by the optical reading device 10 may also be transmitted on an electronic signal, such as a radio wave. Thus, it is may be possible to share and manage information obtained from the bar code among many users.

Moreover, the information in the information read by the optical reading unit 10 may also displayed on the display unit 64. When displaying the information, the information may be displayed in a form that is visually recognized or readable, such that a user can confirm whether the information was correctly read. The read information may also be transmitted to other users after recognizing the read information. Furthermore, the information read by the optical reading device can be also stored in the supplemental storage device 72.

Accordingly, the bar code may be read using a readily convenient device, such as a mobile telephone, and allow sharing of the information. Moreover, if the mobile telephone is used as the information reading device, then the information may be read without having to use other devices. Although a mobile telephone is described, other types of devices, such as a personal handyphone system (PHS) or other various kinds of mobile communication equipment, may be used. Moreover, as shown in FIG. 7, the mobile telephone 60 may include multiple optical reading units or multiple locations for the sensor 41. In addition, the mobile telephone 60 may include one or more switches, such as the activation switch 40, alone or in combination with the sensor 41.

Figure 9:
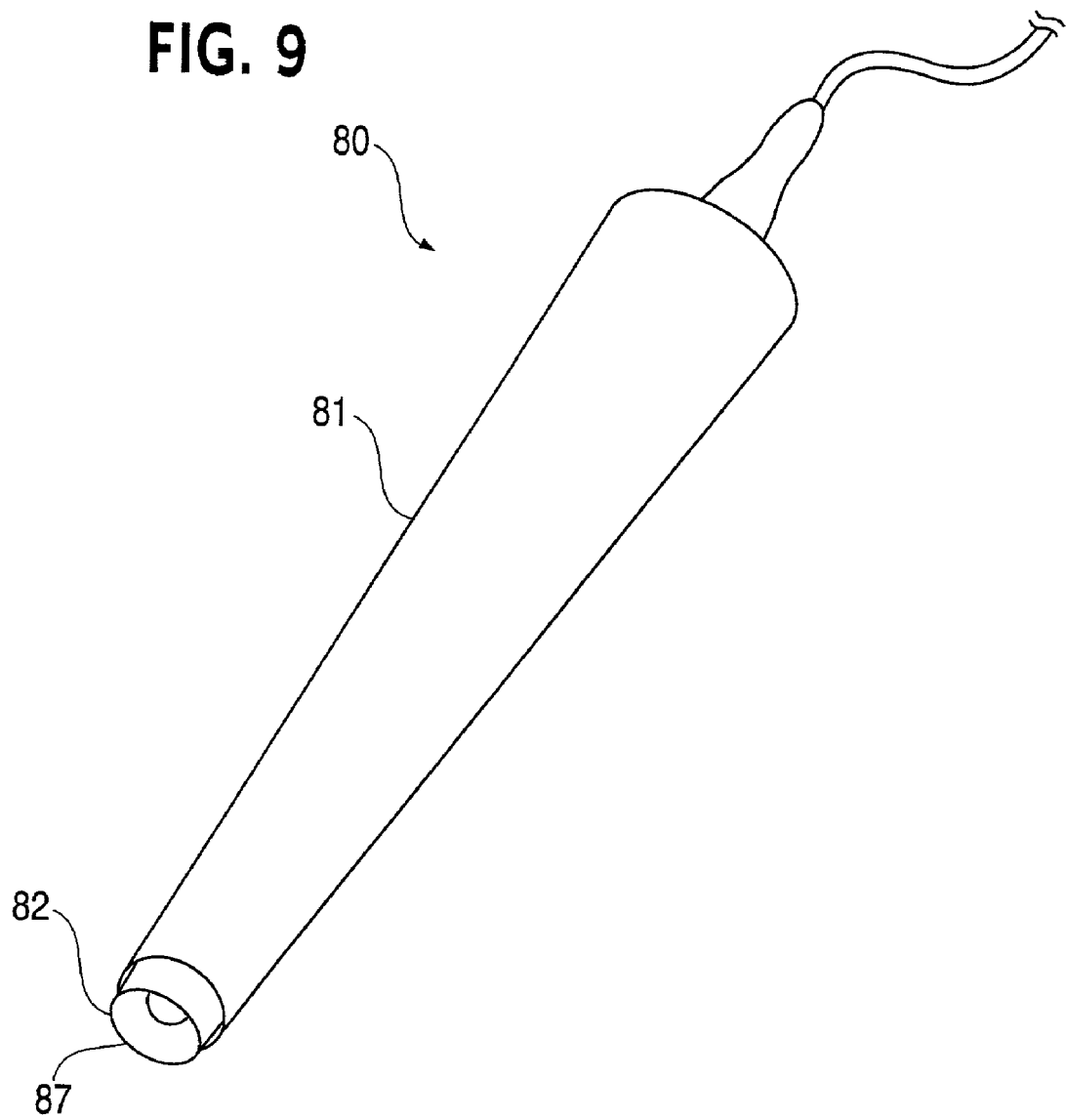
FIG. 9 shows perspective view of a writing instrument having an optical reading device, in accordance with an embodiment consistent with the principles of the present invention.
Figure 10A:
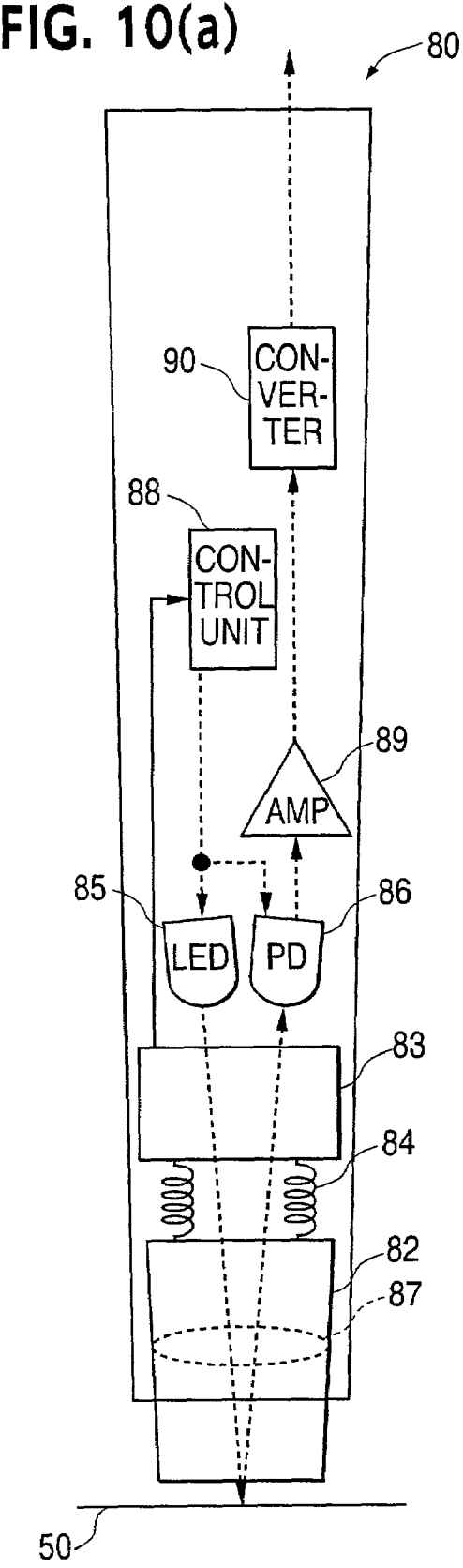
FIGS. 10A and 10B are block diagrams partially showing an internal configuration of the writing instrument shown in FIG. 9, during an idle state and during operation, in accordance with an embodiment consistent with the principles of the present invention.
Figure 10B:
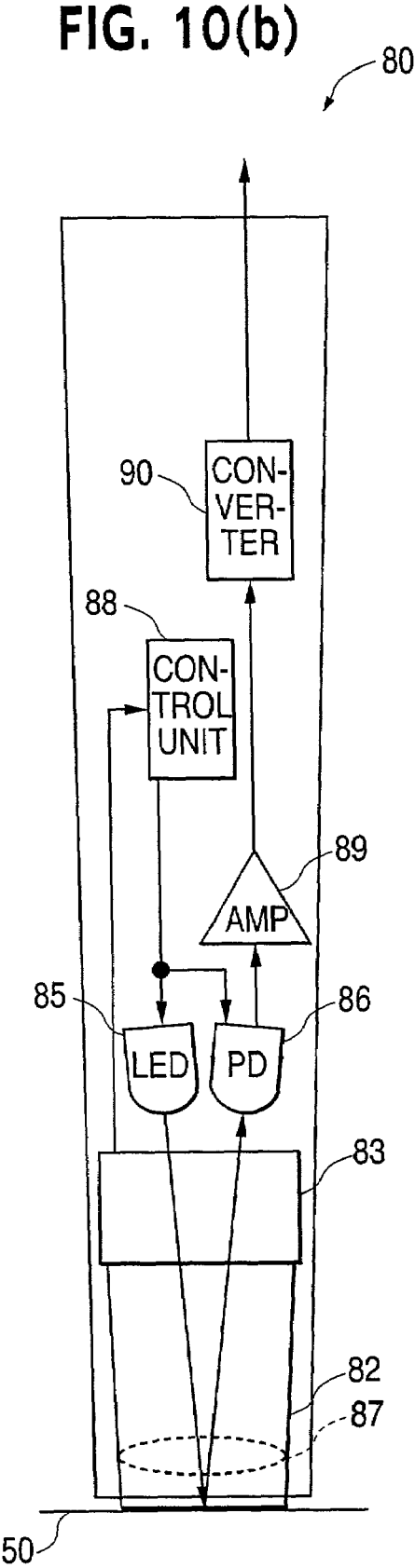

FIG. 9 shows perspective view of a writing instrument having an optical reading device, in accordance with an embodiment consistent with the principles of the present invention. FIGS. 10A and 10B are block diagrams partially showing an internal configuration of the writing instrument shown in FIG. 9 when idle or off and during operation, in accordance with an embodiment consistent with the principles of the present invention.

As shown in FIG. 9, a writing instrument, such as a pen-type instrument, may include an optical reading device (bar code reading device) 80. The bar code reading device 80 may be activated by placing a tip thereof in close proximity or contact with the surface on which the information appears, for example, to read a bar code.

The bar code reading device 80 includes a hollow body tube 81, a cap 82 provided on a tip of the body tube 81, a sensor 83 provided in the body tube, the sensor 83 being a contact detection unit together with the cap 82, springs 84 for connecting the cap 82 and the sensor 83, a light source 85 for irradiating light to the bar code, for example, such as an LED, a light sensor (light detection unit) 86 for detecting reflected light from the bar code, for example, such as a photo diode (PD), a lens 87 for collecting the light irradiated from the light source 85 and the reflected light, an optical system control unit 88 for controlling the light source 85 and the light sensor 86, an amplifier 89 for amplifying an output signal from the light sensor 86, and an A/D converter 90 for converting the output signal from the amplifier 89 into a digital signal.

When the tip of the bar code reading device 80 is apart from the sheet surface 50 on which the bar code is printed, the cap 82 may be held apart from the sensor 83 due to elastic force of the springs 84. As a result, the optical stem control unit 88 puts the light source 85 and the optical sensor 86 in an idle state based on, for example, a signal from the sensor 83.

When reading the bar code, a user may thrust the tip of the bar code reading device 80 by placing it near or against the sheet surface 50 on which the bar code is printed. The cap 82 is pushed into the body tube 81 until it is in close proximity or contacts the sensor 83. The optical system control unit 88 may recognize that the cap 82 is pushed based on, for example, a signal from the sensor 83, and makes the light source 85 and the light sensor 86 operational. When operational, the light source 85 irradiates light. This light is collected by the lens 87 and the collected light is irradiated on the bar code. The light reflected from the bar code is collected by the lens 87, and the collected light is detected by the light sensor 86. The light sensor 86 converts the detected light into an electronic signal. This electronic signal is amplified by the amplifier 89, converted into a digital signal by the A/D converter 90, and may be sent to a host computer (not shown).

In addition, the bar code reading device 80 may be provided with mobile communication equipment, such as the mobile telephone 60. Accordingly, information obtained from the bar code reading device 80 may then be shared and managed among a number of users.

Though the above embodiments have been described by exemplifying a bar code as the information appearing on the surface, other types of information may be read. Specifically, the information appearing on the surface may be any optically readable information, for example, such as text, symbols, images, figures, characters, or image. The read information may also be displayed on a display device and transmitted using an electronic signal. Furthermore, though the above embodiments have been described for a bar code printed on a sheet surface, any type of shape for the surface and any type of surface material may be used, in accordance with the principles of the present invention. As described above, a reading device for optically reading information detects close proximity or contact with a surface on which information, such as a bar code, appears, and the device becomes operational based on detecting the close proximity or contact with the surface. Accordingly, the configuration of the present invention is not limited to those described. Moreover, the light source and the light sensor are not limited to those described.

In addition, many modifications may be made to adapt a particular situation or material to the teaching of the present invention without departing from the scope thereof. Therefore, it is intended that this invention not be limited to the particular embodiments disclosed, but that the invention include all embodiments falling within the scope of the appended claims.

What is claimed is:

1. An optical reading device, comprising:
   an optical reading unit configured on one side of the optical reading device and having a light source unit and a light detection unit, wherein the light source unit irradiates light on a surface and the light detection unit detects light reflected from the surface and converts the detected light into an electronic signal;
   a signal processing unit for analyzing and processing the electronic signal to identify information on the surface; and
   a contact detection unit, comprising a plurality of detectors, configured on the same one side of the optical reading device as the optical reading unit such that the contact detection unit makes contact with the surface to provide a signal to operate the optical reading device, wherein the contact detection unit controls the optical reading unit and is positioned on a center of a contact surface of the optical reading unit.

2. The optical reading device according to claim 1, wherein the detectors include at least one sensor for sensing a pressure change caused by contact with the surface.

3. The optical reading device according to claim 1, wherein the detectors include at least one switch that is turned on based on contact with the surface.

4. The optical reading device according to claim 1, wherein the detectors include a plurality of sensors, and the contact detection unit provides the signal based on when at least one of the plurality of sensors detects contact with the surface.

5. The optical reading device according to claim 1, wherein the detectors include a plurality of switches, and the contact detection unit provides the signal based on when one of the plurality of switches detects contact with the surface.

6. The optical reading device according to claim 1, wherein the detectors include at least one switch and at least one sensor.

7. The optical reading device according to claim 1, wherein the information on the surface is a bar code.

8. The optical reading device according to claim 1, wherein the information on the surface is a character.

9. The optical reading device according to claim 1, wherein the information on the surface is a figure.

10. The optical reading device according to claim 1, wherein the light detection unit includes a charge coupled device.

11. The optical reading device according to claim 1, wherein the light detection unit includes a CMOS sensor.

12. A portable communication device, comprising:
    an optical reading unit configured on one side of the optical reading device and having a light source unit and a light detection unit, wherein the light source unit irradiates light on a surface and the light detection unit detects light reflected from the surface and converts the detected light into an electronic signal;
    a signal processing unit for analyzing and processing the electronic signal to identify information on the surface;
    a contact detection unit, comprising a plurality of detectors, configured on the same side of the portable communication device as the optical reading unit such that the contact detection unit makes contact with the surface to provide a signal to operate the optical reading unit, wherein the contact detection unit controls the optical reading unit and is positioned on a center of a contact surface of the optical reading unit; and
    a transmitting unit for transmitting the information identified by the signal processing unit.

13. The portable communication equipment according to claim 12, further comprising:
    a display device for displaying the information identified by the signal processing unit.

14. The portable communication equipment according to claim 12, further comprising:
    a recording device for recording the information identified by the signal processing unit.

15. The portable communication equipment according to claim 12,
    wherein the transmitting unit transmits the information identified by the signal processing unit via a radio communications signal.

16. The portable communication equipment according to claim 12,
    wherein the detectors include at least one sensor for sensing a pressure change caused by contact with the surface.

17. The portable communication equipment according to claim 12,
    wherein the detectors include at least one switch that is turned on based on contact with the surface.

18. The portable communication equipment according to claim 12,
    wherein the detectors include a plurality of sensors, and the contact detection unit provides the signal based on when at least one of the plurality of sensors detects contact with the surface.

19. The portable communication equipment according to claim 12,
    wherein the detectors include a plurality of switches, and the contact detection unit provides the signal based on when one of the plurality of switches detects contact with the surface.

20. The portable communication equipment according to claim 12,
wherein the detectors include at least one switch and at least one sensor.

21. The portable communication equipment according to claim 12,
wherein the information on the surface is a bar code.

22. The portable communication equipment according to claim 12,
wherein the information on the surface is a character.

23. The mobile communication equipment according to claim 12,
wherein the information on the surface is a figure.

24. The portable communication equipment according to claim 12,
wherein the light detection unit includes a charge coupled device.

25. The portable communication equipment according to claim 12,
wherein the light detection unit includes a CMOS sensor.

* * * * *